United States Patent
Challoner

(10) Patent No.: US 8,205,495 B2
(45) Date of Patent: Jun. 26, 2012

(54) SYSTEMATIC DISC RESONATOR GYROSCOPE TUNING

(75) Inventor: A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 12/481,488

(22) Filed: Jun. 9, 2009

(65) Prior Publication Data

US 2009/0301194 A1 Dec. 10, 2009

Related U.S. Application Data

(60) Provisional application No. 61/060,405, filed on Jun. 10, 2008.

(51) Int. Cl.
*G01P 9/04* (2006.01)
*G01C 19/00* (2006.01)

(52) U.S. Cl. .............. 73/504.13; 73/504.12; 73/1.77

(58) Field of Classification Search .............. 73/504, 73/12, 504.13, 504.14, 504.15, 504.02, 504.04, 73/1.77, 1.37, 1.38
See application file for complete search history.

(56) References Cited

U.S. PATENT DOCUMENTS

| | | | | |
|---|---|---|---|---|
| 5,932,804 A | * | 8/1999 | Hopkin et al. | 73/504.13 |
| 7,159,441 B2 | * | 1/2007 | Challoner et al. | 73/1.77 |
| 7,168,318 B2 | * | 1/2007 | Challoner et al. | 73/504.13 |

* cited by examiner

*Primary Examiner* — Helen C. Kwok
(74) *Attorney, Agent, or Firm* — Canady & Lortz LLP; Bradley K. Lortz

(57) ABSTRACT

Tuning an axisymmetric resonator such as in a disc resonator gyroscope (DRG) is disclosed. Frequency tuning a DRG in a single step informed by a systematic physical model of the resonator structure, sensing and actuation elements, such as a finite element model, is provided. The sensitivity of selected trimming positions on the resonator to reducing asymmetry terms is determined via perturbations of the systematic model. As well, the dependence of the parameters of model transfer functions between actuation and sensing elements on resonator asymmetry are systematically determined. One or two measured transfer functions may then be analyzed according to the systematic model to fully determine the needed asymmetry correction components of the DRG. One or two of four groups of four electrostatic bias electrodes or four groups of four laser trimming locations for the DRG are utilized to correct the asymmetry components which can give rise to mistuning.

22 Claims, 16 Drawing Sheets

Finite Element Model of DRG $M\ddot{x} + Kx = Bu$ $y = sCx$

Solve for Coriolis (n = 2) normal modes: $\xi_1, \lambda_1, \xi_2, \lambda_2$ $x = \xi\eta, \xi = [\xi_1 \ \xi_2], \Lambda^2 = \begin{bmatrix} \lambda_1^2 & 0 \\ 0 & \lambda_2^2 \end{bmatrix}$, normalized so $\xi'M\xi = \begin{bmatrix} 1 & 0 \\ 0 & 1 \end{bmatrix}$ then $\ddot{\eta} + \Lambda^2 \eta = \xi'Bu$ $y = sC\xi\eta$ $= sC\xi(s^2 + \Lambda^2)^{-1}\xi'Bu$ Assume forcers, $u = [u_1 \ u_2]'$ and pickoffs $y = [y_1 \ y_2]'$ are symmetric and aligned with the modal axes of a reference degenerate solution, $\xi_o$ such that the perturbed eigenvectors are $\xi = \xi_o R$, where $R = \begin{bmatrix} \cos\vartheta & \sin\vartheta \\ -\sin\vartheta & \cos\vartheta \end{bmatrix}$ and $\xi_o'B = b\begin{bmatrix} 1 & 0 \\ 0 & 1 \end{bmatrix}, C\xi_o = c\begin{bmatrix} 1 & 0 \\ 0 & 1 \end{bmatrix}$, then $y = sC\xi_o R(s^2 + \Lambda^2)^{-1} R'\xi_o'Bu$ $y = s\,cb\begin{bmatrix} \cos\vartheta & \sin\vartheta \\ -\sin\vartheta & \cos\vartheta \end{bmatrix}\begin{bmatrix} s^2 + \lambda_1^2 & 0 \\ 0 & s^2 + \lambda_2^2 \end{bmatrix}^{-1}\begin{bmatrix} \cos\vartheta & -\sin\vartheta \\ \sin\vartheta & \cos\vartheta \end{bmatrix}u$ $= s\,cb\begin{bmatrix} \dfrac{\cos^2\vartheta}{s^2+\lambda_1^2} + \dfrac{\sin^2\vartheta}{s^2+\lambda_2^2} & -\dfrac{\cos\vartheta\sin\vartheta}{s^2+\lambda_1^2} + \dfrac{\cos\vartheta\sin\vartheta}{s^2+\lambda_2^2} \\ -\dfrac{\cos\vartheta\sin\vartheta}{s^2+\lambda_1^2} + \dfrac{\cos\vartheta\sin\vartheta}{s^2+\lambda_2^2} & \dfrac{\sin^2\vartheta}{s^2+\lambda_1^2} + \dfrac{\cos^2\vartheta}{s^2+\lambda_2^2} \end{bmatrix}u$ $= s\begin{bmatrix} \dfrac{r_{11}}{s^2+\lambda_1^2} + \dfrac{r_{12}}{s^2+\lambda_2^2} & \dfrac{c_{11}}{s^2+\lambda_1^2} + \dfrac{c_{12}}{s^2+\lambda_2^2} \\ \dfrac{c_{21}}{s^2+\lambda_1^2} + \dfrac{c_{22}}{s^2+\lambda_2^2} & \dfrac{r_{21}}{s^2+\lambda_1^2} + \dfrac{r_{22}}{s^2+\lambda_2^2} \end{bmatrix}u$ $\vartheta = -\tan^{-1}\dfrac{c_{11}}{r_{11}} = -\tan^{-1}\dfrac{c_{21}}{r_{22}}$ (no sign ambiguity)

$\vartheta = \tan^{-1}\sqrt{\dfrac{r_{21}}{r_{11}}} = \tan^{-1}\sqrt{\dfrac{r_{12}}{r_{22}}} = \tan^{-1}\sqrt{\dfrac{r_{12}}{r_{11}}} = \tan^{-1}\sqrt{\dfrac{r_{21}}{r_{22}}}$ (sign ambiguity)

$r_{ij}, c_{ij}$ are obtained from the residues of curve fits of the measured transfer functions

FIG. 4A

```
function [f1,f2,th1,th2,th3,th4]=mode_angle(sys_res)
%function [f1,f2,th1,th2,th3,th4]=mode_angle(sys_res)
%sys_res is the FEM xfr fcn model or the model obtained
% from model identification of measured data

[a,b,c,d]=ssdata(sys_res); %outputs are S1,S2 (position);inputs are
D1,D2 (Voltage0
[num1,den1]=ss2tf(a,b,c(1:2,:),d(1:2,:),1);
[num2,den2]=ss2tf(a,b,c(1:2,:),d(1:2,:),2);
[R11,P,K]=residue(num1(1,:),den1);
[R21,P,K]=residue(num1(2,:),den1);
[R12,P,K]=residue(num2(1,:),den1);
[R22,P,K]=residue(num2(2,:),den1);
r11=real(R11(5));
r12=real(R11(6));
c11=real(R21(5));
c12=real(R21(6));

c21=real(R12(5));
c22=real(R12(6));
r21=real(R22(5));
r22=real(R22(6));

th1=-atan2(c11,r11)*180/pi/2;    %modal orientation mechanical angle
th2=-atan2(c21,r22)*180/pi/2;
th3=atan(sqrt(r21/r11))*180/pi/2;
th4=atan(sqrt(r12/r11))*180/pi/2;
f1=imag(P(6)/2/pi);   % FEA designates lower mode as first mode
f2=imag(P(5)/2/pi);   % FEA designates hihgernmode as second mode
```

FIG. 4B

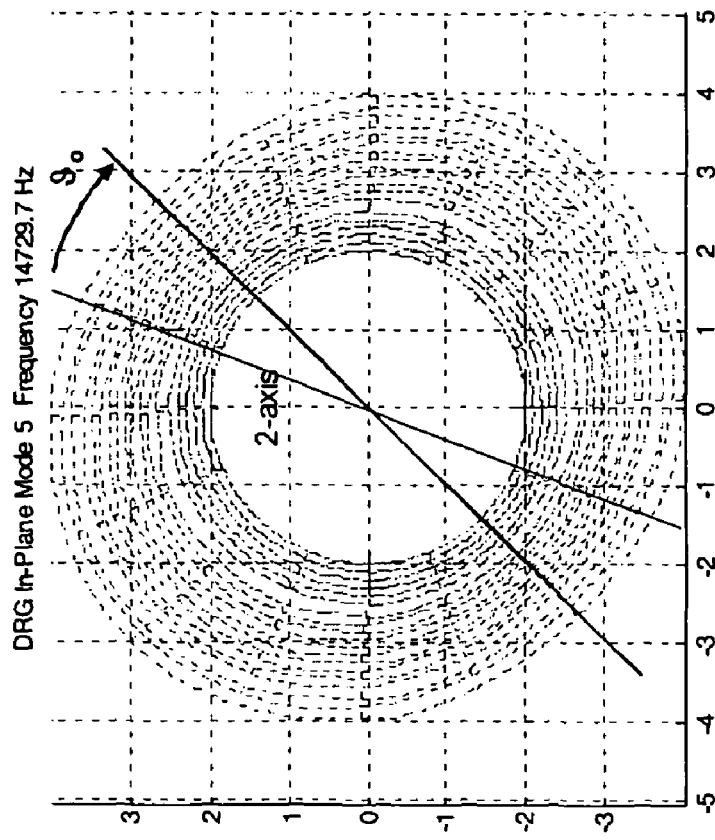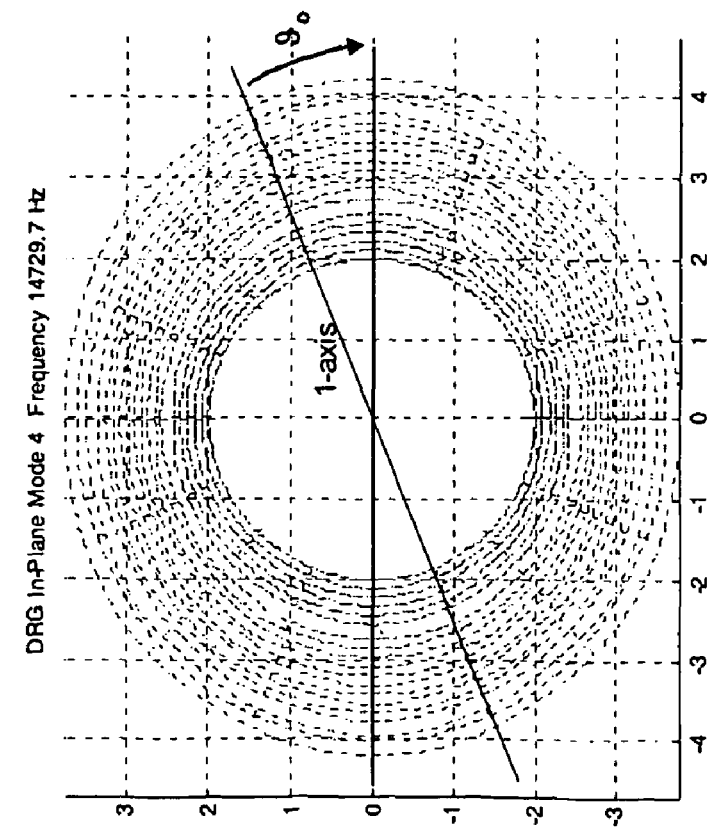
FIG. 6C

SYSTEMATIC DISC RESONATOR GYROSCOPE TUNING

CROSS-REFERENCE TO RELATED APPLICATIONS

This application claims the benefit under 35 U.S.C. §119 (e) of the following U.S. Provisional Patent Application, which is incorporated by reference herein:

U.S. Provisional Application Ser. No. 61/060,405, filed Jun. 10, 2008, by A. D. Challoner, entitled "SYSTEMATIC DISK RESONATOR GYROSCOPE TUNING METHOD".

This application is related to the following co-pending applications, which are all incorporated by reference herein:

U.S. patent application Ser. No. 12/473,084, filed May 27, 2009, and entitled "ISOLATED ACTIVE TEMPERATURE REGULATOR FOR VACUUM PACKAGING OF A DISC RESONATOR GYROSCOPE", by Ge et al.;

U.S. patent application Ser. No. 12/416,911, filed Apr. 1, 2009, and entitled "ENVIRONMENTALLY ROBUST DISC RESONATOR GYROSCOPE", by Ge et al.;

U.S. patent application Ser. No. 12/416,894, filed Apr. 1, 2009, and entitled "THERMAL MECHANICAL ISOLATOR FOR VACUUM PACKAGING OF A DISC RESONATOR GYROSCOPE", by Ge et al.;

U.S. patent application Ser. No. 11/458,911 (Application Publication No. US 2007 0017287 A1), filed Jul. 20, 2006, and entitled "DISC RESONATOR GYROSCOPES", by Kubena et al.;

U.S. patent application Ser. No. 11/757,395 (Application Publication No. 2008-0295622A1), filed Jun. 4, 2007, and entitled "PLANAR RESONATOR GYROSCOPE WITH CENTRAL DIE ATTACHMENT", by Challoner; and U.S. patent application Ser. No. 11/831,822, filed Jul. 31, 2007, and entitled "DISC RESONATOR INTEGRAL INERTIAL MEASUREMENT UNIT", by Challoner et al.

BACKGROUND OF THE INVENTION

1. Field of the Disclosure

The present disclosure relates to gyroscopes, and in particular to disc resonator gyroscopes. More particularly, this invention relates to tuning disc resonator gyroscopes.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, or sensors, torquers, or actuators and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and 3D curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

More recently, a novel resonator structure comprising a disc using embedded electrostatic electrodes for excitation and sensing has been developed for microgyro applications. In general, the electrodes are formed along with the resonator by through etching a wafer selectively bonded to a baseplate such that the through-etched sidewalls form the capacitive gaps between the electrodes and the resonator and the electrodes and the resonator remain separately bonded to the baseplate. Three-dimensional vibration modes of the disc are excited and sensed to measure angular rate. Some development of such disc resonator gyroscopes (DRG) and applications has already occurred. For a detailed description of a current exemplary DRG assembly, see e.g. U.S. Pat. No. 7,040,163 and U.S. patent application Ser. No. 11/757,395, filed Jun. 4, 2007 and entitled "PLANAR RESONATOR GYROSCOPE CENTRAL DIE ATTACHMENT" by A. D. Challoner, which are incorporated by reference herein.

Performance and operation of such DRGs is facilitated through a variety of tuning techniques. The disc resonators may be physically tuned through precise selective mass removal on the disc resonator structure. In addition, electrostatic tuning of the disc resonators may accomplished by applying appropriate electrostatic tuning signals to bias electrodes of the DRG as it is operated in order to reduce the effect of asymmetry of the disc resonator giving rise to accuracy errors of the inertial rate measurements as well as drift. Previous tuning techniques for DRGs involved multi-step trial and error or computerized search methods such as simulated annealing, which are laborious or time consuming.

In view of the foregoing, there is a need in the art for techniques applied to DRGs to tune them more efficiently. There is particular need for such techniques to tune DRGs early in a manufacturing screening process more easily and at a reduced cost. There is a need for such DRG tuning techniques to lower noise and drift and reduce manufacturing cost of tuning. As detailed below, the present invention satisfies all these and other needs.

SUMMARY OF THE INVENTION

Techniques for systematically tuning an axisymmetric resonator such as in a disc resonator gyroscope (DRG) are disclosed. A method for frequency tuning a disc resonator gyroscope (DRG) in a single step informed by a systematic physical model of the resonator structure, sensing and actuation elements, such as a finite element model, is provided. The sensitivity of selected trimming positions on the resonator to reducing the sin(4θ) and cos(4θ) asymmetry terms are determined via perturbations of the systematic model. As well, the dependence of the parameters of model transfer functions between actuation and sensing elements on resonator asymmetry are systematically determined. One or two measured transfer functions may then be analyzed according to the systematic model to fully determine the needed sin(4θ) and cos(4θ) asymmetry correction components of the DRG. One or two of four groups of four electrostatic bias electrodes or four groups of four laser trimming locations for the DRG are utilized to correct the sin(4θ) and cos(4θ) asymmetry components which can give rise to mistuning of the DRG.

A typical method of tuning an axisymmetric resonator comprises determining transfer functions between drive electrode voltages and sense electrode voltages of the axisymmetric resonator including Coriolis coupled vibration modes of the axisymmetric resonator, determining fourth order asymmetry correction components using the transfer functions of the axisymmetric resonator, determining an asymmetry component change sensitivity to changes of one or more bias voltages based on a systematic physical model of the axisymmetric resonator, and determining values of the one or more bias voltages to tune the Coriolis coupled vibration modes of the axisymmetric resonator to degeneracy from the fourth order asymmetry correction components and the asymmetry component change sensitivity to the changes of the one or more bias voltages. In addition, the method may also include applying the settings of the one or more bias voltages under a closed loop control to tune the Coriolis coupled vibration modes of the axisymmetric resonator to degeneracy. Applying the settings of the one or more bias voltages under the closed loop control may be performed in a single step.

In some embodiments, the transfer functions are derived numerically from a finite element model (FEM) of the axisymmetric resonator. The fourth order asymmetry correction components may be derived from the FEM of the axisymmetric resonator. The transfer functions may also be measured from the axisymmetric resonator. In this case, the fourth order asymmetry correction components may be determined from the measured transfer functions. In one notable example, the transfer functions may be measured from the axisymmetric resonator with a dynamic signal analyzer.

Typically, the axisymmetric resonator tuned by the described methods comprises a disc resonator including embedded electrostatic electrodes having sidewalls that interact with interior sidewalls of the disc resonator such that the Coriolis coupled vibration modes of the disc resonator are driven and sensed with the embedded electrostatic electrodes to measure motion of the disc resonator.

In a similar manner another method of tuning an axisymmetric resonator, comprises determining transfer functions between drive electrode voltages and sense electrode voltages of the axisymmetric resonator including Coriolis coupled vibration modes of the axisymmetric resonator, determining fourth order asymmetry correction components using the transfer functions of the axisymmetric resonator, determining an asymmetry component change sensitivity to mass changes at one or more locations of the axisymmetric resonator based on a systematic physical model of the axisymmetric resonator, and determining amounts of the mass changes at the one or more locations of the axisymmetric resonator to tune the Coriolis coupled vibration modes of the axisymmetric resonator to degeneracy from the fourth order asymmetry correction components and the asymmetry component change sensitivity to the mass changes at the one or more locations of the axisymmetric resonator. This method may be further modified consistent with the other tuning methods described herein.

Another method embodiment for tuning an axisymmetric resonator, comprises measuring transfer functions between drive electrode voltages and sense electrode voltages of the axisymmetric resonator with a dynamic signal analyzer including Coriolis coupled vibration modes of the axisymmetric resonator, determining fourth order asymmetry correction components from the measured transfer functions of the axisymmetric resonator, determining an asymmetry component change sensitivity to changes of one or more tuning parameters of the axisymmetric resonator based on a systematic physical model of the axisymmetric resonator, and determining settings of the one or more tuning parameters to tune the Coriolis coupled vibration modes of the axisymmetric resonator to degeneracy from the fourth order asymmetry correction components and the asymmetry component change sensitivity to the changes of the one or more bias voltages. The one or more tuning parameters may comprise changes of one or more bias voltages of the axisymmetric resonator while the settings comprise values of the one or more bias voltages. Alternately, the one or more tuning parameters may comprise mass changes at one or more locations of the axisymmetric resonator while the settings comprise amounts of the mass changes at the one or more locations of the axisymmetric resonator. This method may also be further modified consistent with the other tuning methods described herein.

BRIEF DESCRIPTION OF THE DRAWINGS

Referring now to the drawings in which like reference numbers represent corresponding parts throughout:

FIGS. 4A to 4B illustrate an example alternate computational solution to derive modal axis orientation derived from transfer function residues;

FIGS. 6A to 6C illustrate a tuning simulation of on a systematic physical model of a disc resonator.

DETAILED DESCRIPTION OF THE PREFERRED EMBODIMENT

1. Overview

A systematic method for frequency tuning a disc resonator gyroscope (DRG) in a single step is provided. One or two transfer functions may be analyzed to fully determine the needed $\sin(4\theta)$ and $\cos(4\theta)$ asymmetry correction components. One or two of the four groups of four electrostatic bias electrodes or four groups of four laser trimming locations are utilized to correct all the $\sin(4\theta)$ and $\cos(4\theta)$ asymmetry components which can give rise to mistuning of the DRG.

This technique avoids previous laborious or time consuming multi-step trial and error or computerized search methods such as simulated annealing. From the residues of device transfer functions the frequency split, $\Delta f$, and orientation, $\theta o$, of the Coriolis modes and the fourth Fourier component of asymmetry is systematically determined using relations based on analysis of the finite element model equations. The required $\cos(4\theta)$ and $\sin(4\theta)$ asymmetry correction components $a_4 = -\Delta f \cos(4\theta_0)$ and $b_4 = -\Delta f \sin(4\theta_0)$ then follow.

To provide these correction components with applied voltages to the bias electrodes a finite element model may used to first determine basic asymmetry change sensitivities to bias voltage changes and then a nonlinear system of two equations is solved yielding four solutions for the bias voltages that need to be applied to two of the four groups of electrodes. One of these solutions is selected and then applied to tune the DRG in a single step. Alternatively, the asymmetry change sensitivities to material removal by laser trimming of the designated four groups of four locations, adjacent the bias electrodes may be determined by perturbation of a finite element model of the DRG. These sensitivities are applied to determine the amount of material to be removed at two of the groups of four locations to tune the DRG in a single step or in two steps, allowing for calibration of the material removal rate.

2. Disc Resonator Gyroscope

Figure 1:
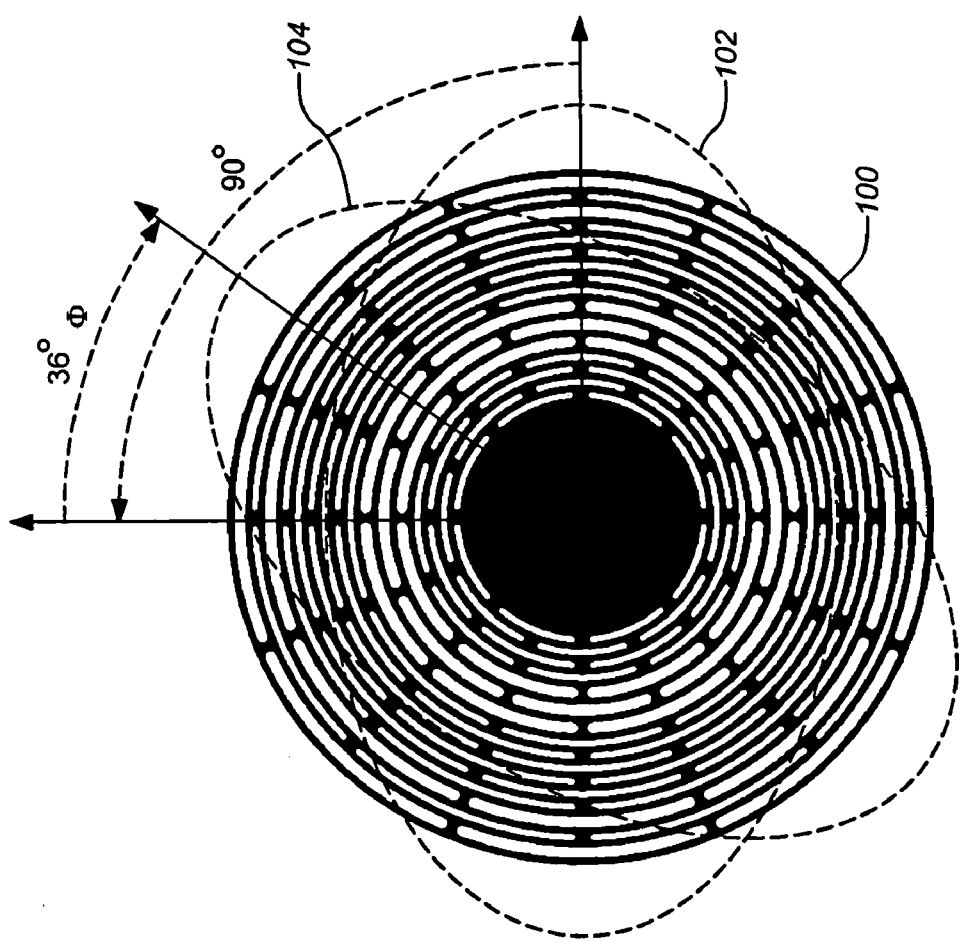
FIG. 1 illustrates a current disc resonator gyroscope (DRG) device.

FIG. 1 illustrates operation of an exemplary disc resonator gyroscope (DRG). The DRG is a symmetric etched resonator disc 100 design that can provide an accurate indication of inertial rotation angle through the observation or control of its modes of vibration. As shown, the second mode of vibration involving two positive radial antinodes (n=2) resembles an elliptical pattern at the original location 102. When the case supporting the resonator 100 is rotated by 90 degrees the elliptical vibration pattern starting at location 102 is seen by pickoffs on the case to precess by −36 degrees due to the response to Coriolis forces. Thus, the elliptical pattern shifts from its original location 102 to the final location 104 when the resonator 100 is rotated 90 degrees. This precession angle, $\Phi$ is always the same precise fraction, k of the inertial rotation, $\psi$ so that one can infer that $\Phi = -\psi/k$. The mechanical angular gain, k is determined solely by the shape of the disc resonator 100 which is highly insensitive to environmental effects. For a detailed description of a current exemplary DRG assembly, see e.g. U.S. Pat. No. 7,040,163 and U.S. patent application Ser. No. 11/757,395, which are incorporated by reference herein.

As a practical matter asymmetry in the disc resonator can affect the inertial accuracy of the gyroscope. Asymmetry in the effective mass or stiffness distribution of the disc can be represented in terms of its four significant Fourier components.

$$A(\vartheta) = \sum_{n=1}^{4} a_n \cos(n\vartheta) + b_n \sin(n\vartheta) \qquad (1)$$

A fourth order, n=4, component of asymmetry will cause one elliptical vibration pattern or mode to vibrate at a different frequency than the other resulting in beating and pinning of the vibration relative to the case, preventing its free precession in response to inertial rate. Determining an asymmetry change sensitivity (e.g. such as indicates a frequency shift sensitivity of the coupled modes) from a systematic model is important to enable tuning axisymmetric resonators according to the present disclosure. Any other component of asymmetry will not affect vibration frequency of the n=2 modes. However, with acceleration of the case, the n=1, 2 and 3 components of asymmetry will result in excitation or disturbance of the n=2 mode vibration giving a false indication of inertial rate.

In general, tuning of the n=2 Coriolis modes results from the elimination of fourth order asymmetry in the physical structure, i.e., a real asymmetry in mass or stiffness distribution. The n=2 Coriolis vibratory modes (or more specifically, the transfer functions at those frequencies) provide information of the magnitude of this physical asymmetry (proportional to frequency split, $\Delta f$) and its orientation $\theta o$ in trim system coordinates. After systematically determining the sensitivity of (induced) fourth order asymmetry components to variations in the mass or voltages at a sufficiently complete set of trim points using an accurate physical model of the actual resonator (e.g. a FEM) a single step solution is described for the trim values required to trim or cancel the measured fourth order asymmetry component present after etching of the applicable axisymmetric resonator structure.

3. Single Step Disc Resonator Gyroscope Frequency Tuning

Frequency tuning or elimination of the fourth component of asymmetry is also most important for sensitive closed loop operation in which the force to keep the vibration pattern fixed in the case, the force to rebalance, is a measure of the Coriolis force and hence the inertial rate of the case. A typical DRG design provides electrodes for capacitive sense and control to drive the vibration at fixed amplitude and to keep the pattern fixed in the case under closed loop control. A high fidelity, finite element model (FEM) comprised of approximately 2500 two-dimensional Euler beams can provide the basis for control system design by providing models of the four transfer functions between the drive (D1) and output (D2) forcing electrode voltages and the drive axis sense (S1) and output axis sense (S2) electrode voltages.

Figure 2A:
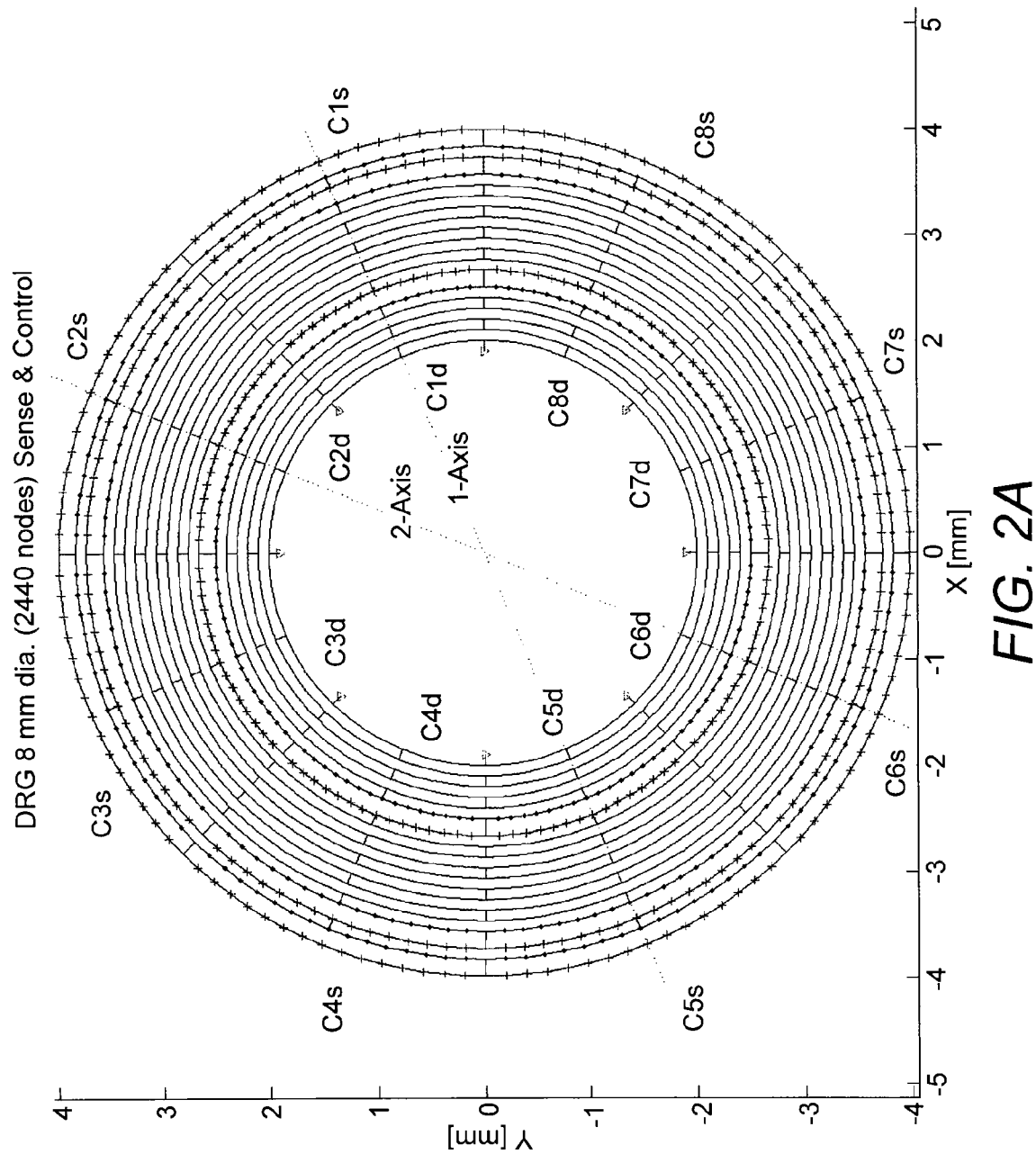
FIG. 2A shows an exemplary DRG FEM design model illustrating a resonator and electrode design.

FIG. 2A shows an exemplary DRG FEM design model illustrating a resonator and electrode design. The model defines a symmetric structure with rich internal sensing and control. Typical capacitance connections used to generate S1, S2 and D1, D2 may be seen in U.S. Pat. No. 7,493,814, which is incorporated by reference herein. The approximately 2500 two-dimensional Euler beams yield the computationally efficient model. The model employs the resonator structure only with an electrical analytical extension. The rings outboard to the electrodes are marked "+", inboard, "." (Bias electrodes are not shown.) The capacitance models are derived C1s-C8s, C1d-C8d and a linear electrostatic stiffness from all electrodes is included. The models may be reduced for MEMS development—fabrication, electronics & control systems.

Figure 2B:
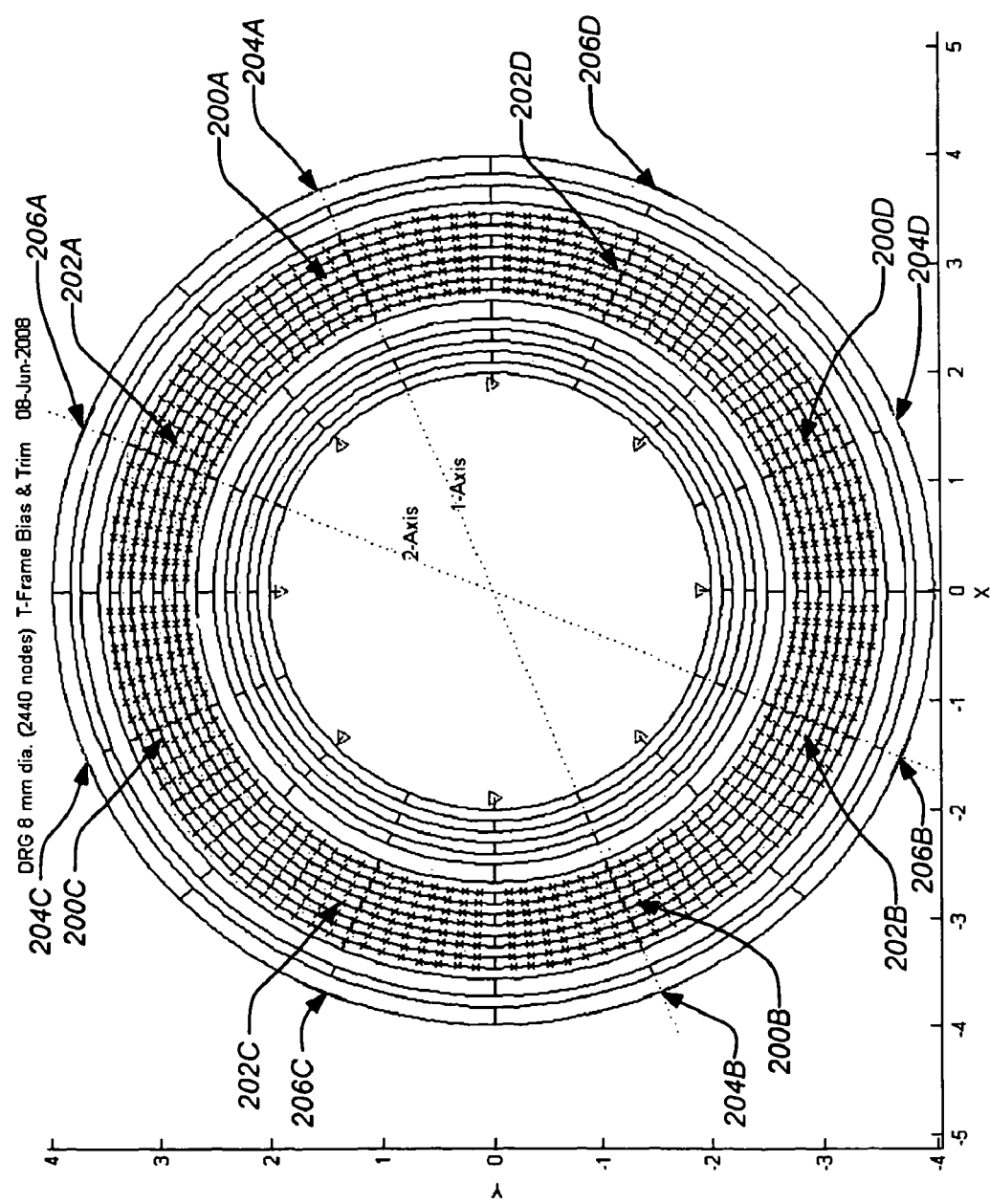
FIG. 2B illustrates elimination of the etch asymmetry corresponding to the cos(4θ) for the model.

FIG. 2B illustrates elimination of the etch asymmetry corresponding to the $\cos(4\theta)$ for the FEM. The objective is to drive the etch asymmetry (equation (1)) to zero. The model indicates the T-Frame bias & trim electrodes, the BT1 electrodes 200A-200D (marked with "x" symbols) in four regions around the 1-axis and the BT2 electrodes 202A-202D in four regions around the 2-axis. The electrodes 200A-200D, 202A-202D are arranged in the two sets of four for frequency tuning to eliminate the $\cos(4\theta)$ asymmetry term from equation (1). The BT1 electrodes 200A-200D are use for the a4 term being greater than 0 and the BT2 electrodes 202A-202D are used for the a4 term being less than 0. The BT1 or BT2 electrodes are biased relative resonator. Illustrative T-Frame laser mass trim location are also indicated on the model. MT1 mass trim locations 204A-204D are used for a4 term less than 0 and the MT2 mass trim locations 206A-206D are used for the a4 term being greater than 0. Other locations on the disc resonator (e.g. the radial "spokes"—connections between the concentric rings of the disc resonator) may also be used for trim or mass addition to tune the disc resonator.

Figure 2C:
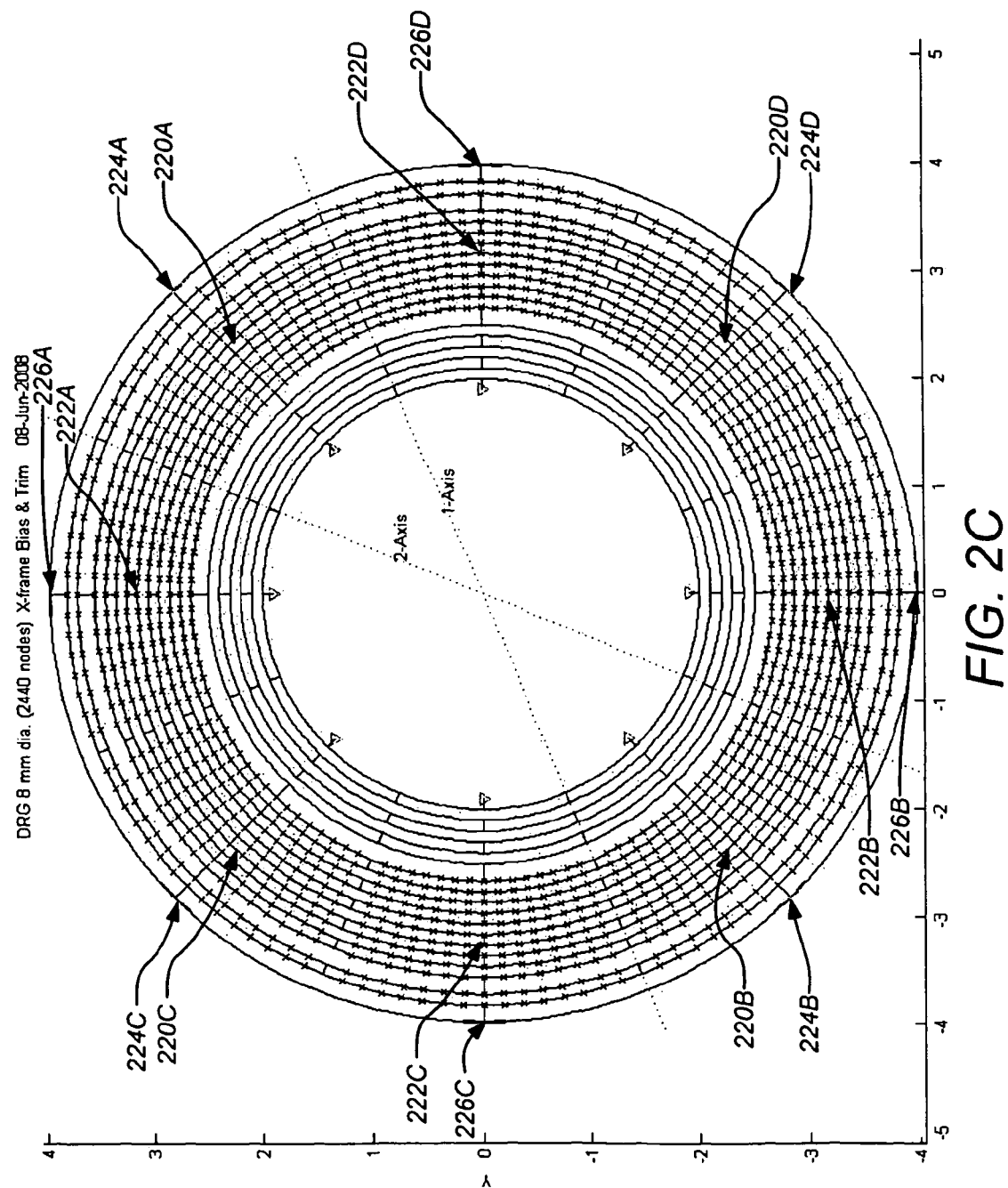
FIG. 2C illustrates elimination of the etch asymmetry corresponding to the sin(4θ) for the model.

FIG. 2C illustrates elimination of the etch asymmetry corresponding to the $\sin(4\theta)$ for the FEM. As before, the objective is to drive the etch asymmetry (equation (1)) to zero. Here, the model indicates the X-Frame bias & trim electrodes, the BX1 electrodes 220A-220D (marked with "x" symbols) in four regions between the 1-axis and 2-axis and the BX2 electrodes 222A-222D in four regions between the BX1 regions. The electrodes 220A-220D, 222A-222D are arranged in the two sets of four for frequency tuning to eliminate the $\sin(4\theta)$ asymmetry term from equation (1). The BX1 electrodes 220A-220D are use for the a4 term being greater than 0 and the BX2 electrodes 222A-222D are used for the a4 term being less than 0. The BX1 or BX2 electrodes are biased relative resonator. Illustrative T-Frame laser mass trim location are also indicated on the model. MX1 mass trim locations 224A-224D are used for a4 term less than 0 and the MX2 mass trim locations 226A-226D are used for the a4 being greater than 0. Other locations on the disc resonator (e.g. the radial "spokes"—connections between the concentric rings of the disc resonator) may also be used for trim or mass addition to tune the disc resonator.

Figure 3A:
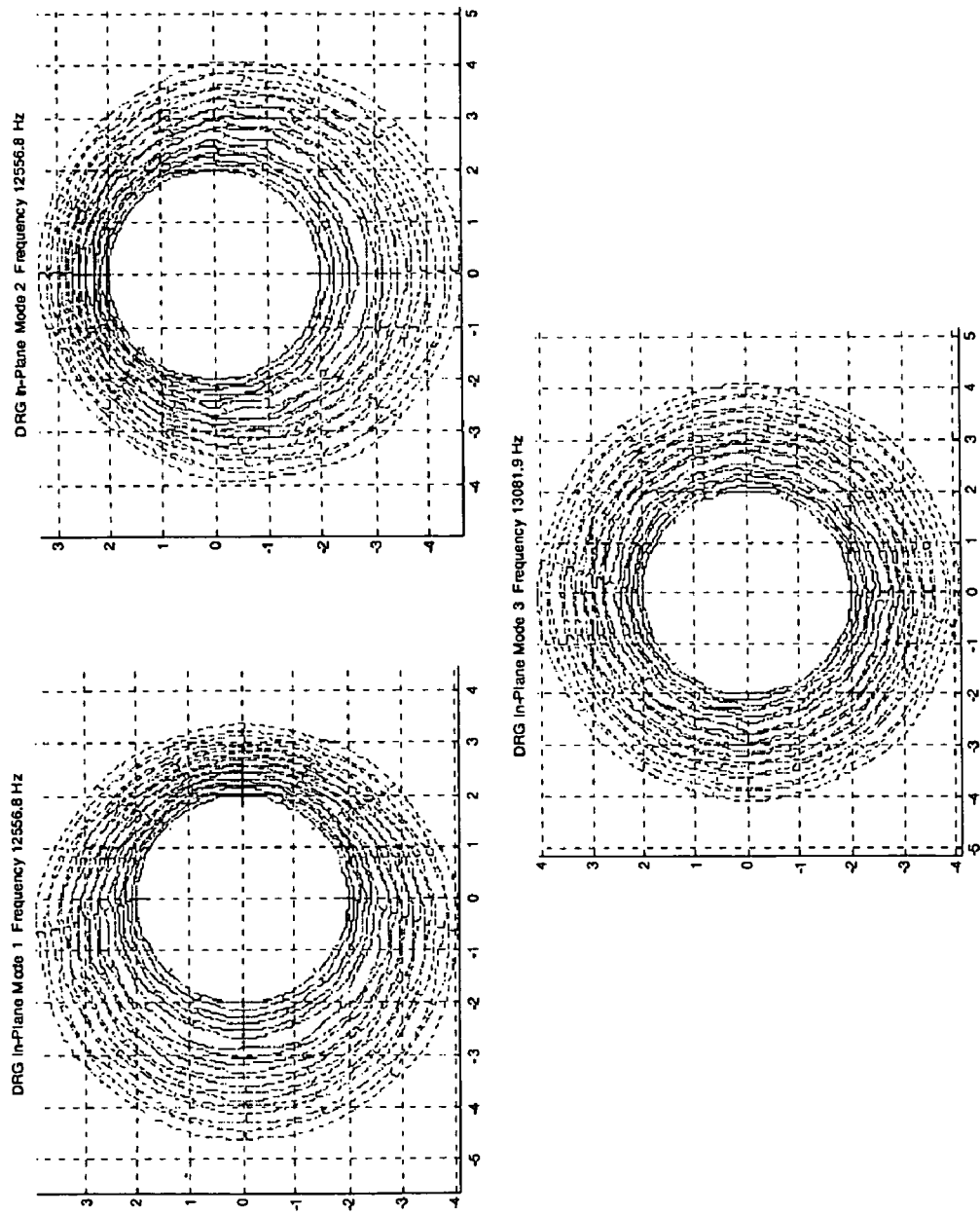
FIGS. 3A-3D show plots illustrating various in-plane modes of the disc resonator model.
Figure 3B:
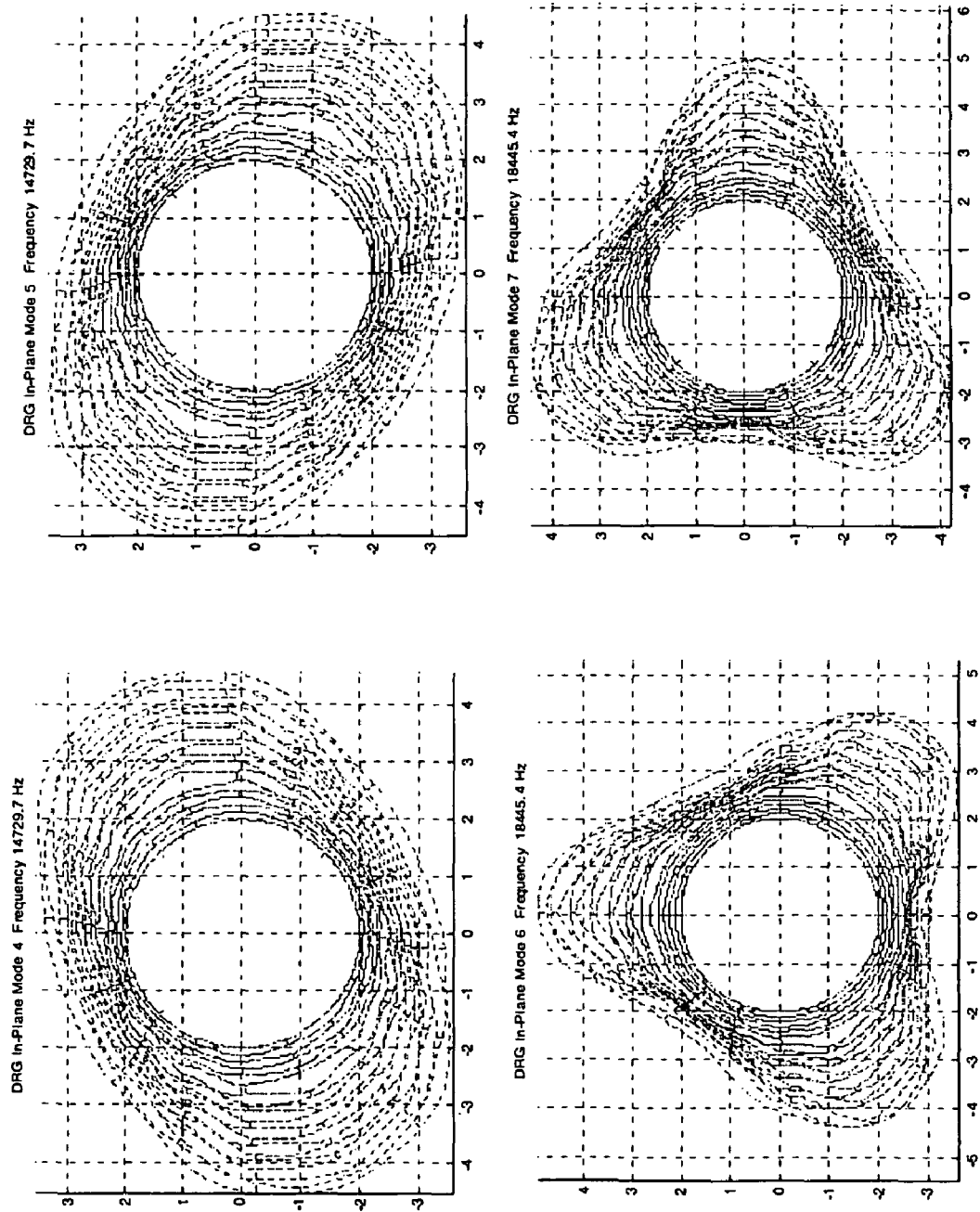
Figure 3C:
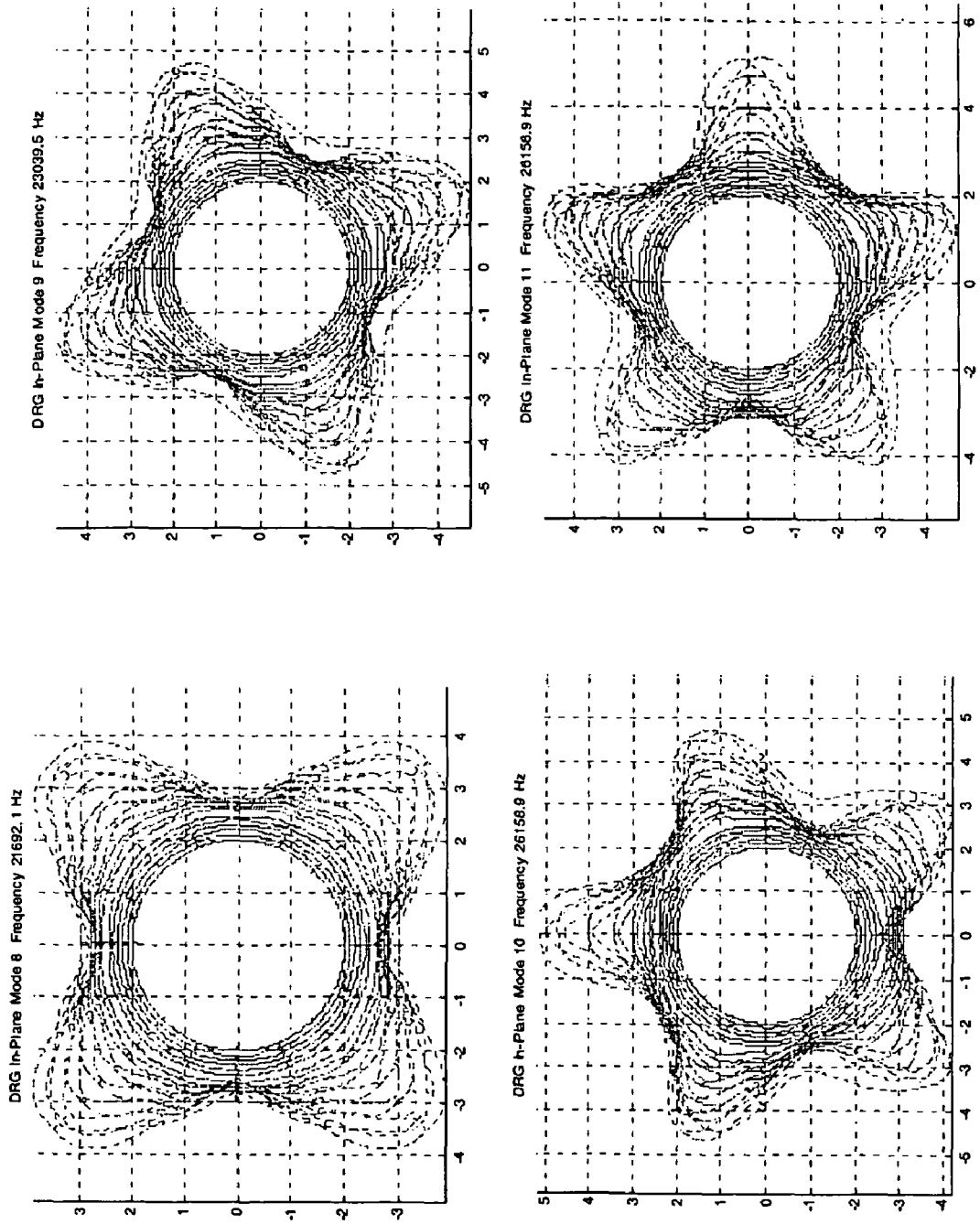
Figure 3D:
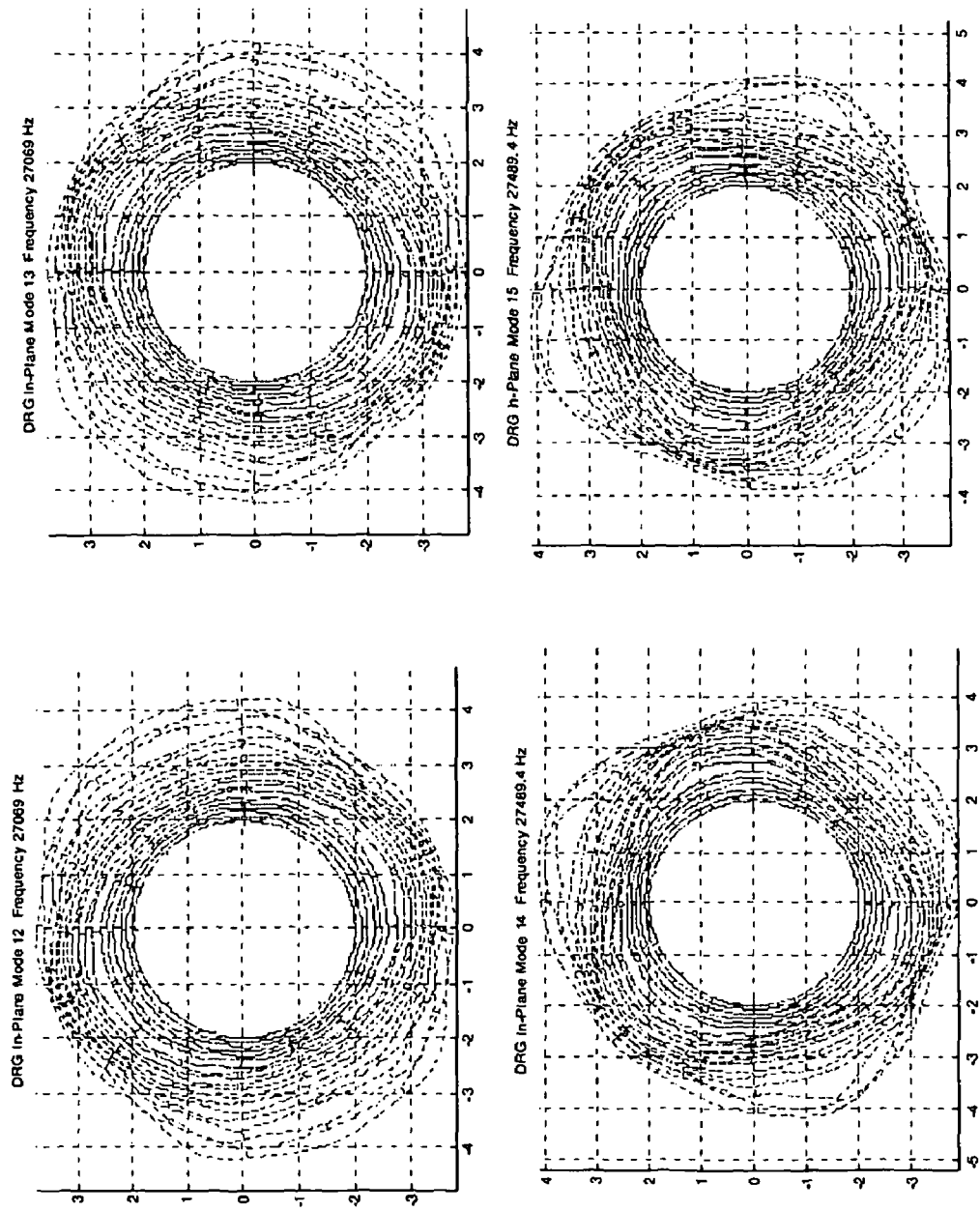

FIGS. 3A-3D show plots illustrating various in-plane modes of an example disc resonator FEM. FIG. 3A shows n=1 or lateral in-plane modes for the disc resonator in the top two plots and the torsion mode in the lower plot. FIG. 3B shows the n=2 primary Coriolis in-plane modes in the top two plots and n=3 in-plane modes in the bottom two plots. FIG. 3C shows the n=4 in-plane modes in the top two plots and the n=5 in-plane modes in the bottom two plots. FIG. 3D shows the parasitic in-plane modes of the disc resonator. To find the orientation $\theta o$ of the modes computed by the FEM a two-dimensional spatial plot of the eigenvectors or mode shapes may be used.

FIG. 4A illustrates an example alternate computational solution to derive modal axis orientation derived from transfer function residues. In this case, the residues of the computed or measured transfer functions can provide modal orientation based on an analysis of the FEM. FIG. 4B shows an example MATLAB script that derives $\theta o$ from the FEM system model or identified models from a transfer function measurement. Residues can also be obtained from measured transfer functions with various commercial curve fitting algorithms such as provided by a signal analyzer, e.g. the HP3562A Dynamic Signal Analyzer. The required $\cos(4\theta)$ and $\sin(4\theta)$ asymmetry component corrections then follow as $a_4 = -\Delta f \cos(4\theta o)$ and $b_4 = -\Delta f \sin(4\theta o)$.

Asymmetry component sensitivity to electrostatic bias change should also be defined for optimum DRG tuning. A voltage applied to any of the four groups of four tuning bias electrodes (BT1, BT2, BX1, BX2) will change both frequencies of the n=2 Coriolis modes. The sensitivity of asymmetry component change to the resonator bias voltage, GB, and tuning bias electrode voltages may be determined using the FEM. Example electrostatic bias sensitivity terms for a DRG may be defined as follows.

KfB, the change in $f_{1,2}$ in Hz, per change in $GB^2$, BT1, 2=BX1,2=0 (Reference, optional)

KfT, the change in $f_{1,2}$ in Hz, per change in $((GB-BT1,2)^2-GB^2)$, BX1,2=0, GB fixed KfT/kfT, the change in $f_{2,1}$, Hz, per change in $((GB-BT1,2)^2-GB^2)$, BX1,2=0, GB fixed KfX, the change in $f_{1,2}$ in Hz, per change in $((GB-BX1,2)^2-GB^2)$, BT1,2=0, GB fixed KfX/kfX as the change in $f_{2,1}$, in Hz, per change in $((GB-BX1,2)^2-GB^2)$, BT1,2=0, GB fixed Some typical electrostatic bias sensitivities for an 8 mm dia. silicon DRG are: KfB=−0.0492 Hz/V$^2$; KfT, KfX of approximately −0.00769 and −0.01512 Hz/V$^2$, respectively; and kfT, kfX of approximately 4.1278 and 4.8158, respectively.

An example single step solution for tuning a DRG with electrostatic bias includes solving for BX and BT. Thus, $$b_4 = -\sin(4\theta o)\Delta f = KfX((GB-BX)^2(1-1/kfX)+GB^2(1/kfX-1)),$$

$$a_4 = -\cos(4\theta o)\Delta f = KfT((GB-BT)^2(1-1/kfT)+GB^2(1/kfT-1))$$

Apply BX and BT bias voltages closest to modal axis.

$$b_4 = KfX((GB-BX)^2(1-1/kfX)+GB^2(1/kfX-1))$$

$$a_4 = KfT((GB-BT)^2(1-1/kfT)+GB^2(1/kfT-1))$$

which simplifies to:

$$b_4/(-GB^2 KfX(1-1/kfX)) \equiv a = x^2-2x, x = BX/GB$$

$$a_4/(-GB^2 KfT(1-1/kfX)) \equiv b = y^2-2y, y = BT/GB$$

The four solutions for x and y are:

$$x = 1+\sqrt{1+a}, x = 1+\sqrt{1+a}, x = 1-\sqrt{1+a}, x = 1-\sqrt{1+a}$$

$$y = 1+\sqrt{1+b}, y = 1-\sqrt{1+b}, y = 1+\sqrt{1+b}, y = 1-\sqrt{1+b}$$

The last solution, $x = 1-\sqrt{1+a}$ and $y = 1-\sqrt{1+b}$, provides the lowest absolute voltages and is usually preferred. It should be noted that those skilled in the art may readily develop solutions to determine asymmetry component sensitivity to electrostatic bias voltages for alternate disc resonators having different structures and electrode designs.

Asymmetry component sensitivity to material mass changes (addition or removal) of the disc resonator is also analyzed for DRG tuning. Material removed from or added to any of the four groups of four tuning locations (MT1, MT2, MX1, MX2) will change both frequencies of the n=2 Coriolis modes. The sensitivity of asymmetry component change to the material removed (or added) is determined using the FEM. Example mass change sensitivity terms for a DRG may be defined as follows MfT, the change in $f_{1,2}$ in Hz, per change in MT1,2 with MX1,2 untrimmed MfT/mfT, the change in $f_{2,1}$ Hz, per change in MT2,1 with MX1,2 untrimmed MfX, the change in $f_{1,2}$ in Hz, per change in MX1,2 with MT1,2 untrimmed MfX/mfX as the change in $f_{2,1}$, in Hz, per change in MX2,1 with fixed Some typical mass change sensitivities for an 8 mm dia. silicon DRG are: MfT, MfX are −0.3373, −0.3909 Hz/μm, respectively (−10 μm of trim removes 868.3 ng) and mfT, mfX are 3.3782, 4.9792, respectively.

An example single step solution for tuning a DRG with mass change includes solving for MX and MT. Thus, $$b_4 = -\sin(4\theta o)\Delta f = MfX * MX(1 - 1/mfX)$$

$$a_4 = -\cos(4\theta o)\Delta f = MfT * MT(1 - 1/mfT)$$

Apply MX and MT trim amounts closest to modal axis.

$$MX = b_4/(MfX(1 - 1/mfX))$$

$$MT = a_4/(MfT(1 - 1/mfT))$$

It should be noted that those skilled in the art may readily develop solutions to determine asymmetry component sensitivity to material mass changes for alternate disc resonators having different structures.

In a typical embodiment of the disclosure, the tuned asymmetric resonator may comprise a disc resonator as in a disc resonator gyroscope (DRG), having embedded electrostatic electrodes having sidewalls that interact with interior sidewalls of the disc resonator such that vibration modes of the disc resonator are driven and sensed with the embedded electrostatic electrodes to measure motion of the disc resonator, and a baseplate having a topside bonded to support the disc resonator and having electrical traces coupled from the embedded electrostatic electrodes and to a baseplate periphery. The disc resonator structure may be characterized as a plurality of interconnected concentric rings with embedded electrodes in the gaps between the concentric rings. The interconnections between the rings of the disc resonator may be aligned such that "spokes" are exhibited, e.g. as shown in FIG. 1. Structure and operation of the DRG is known, e.g. as described in U.S. Pat. Nos. 6,944,931, 7,347,095, 7,040,163, 7,401,397, 7,168,318, 7,285,844, 7,396,478, and 7,437,253 which are all incorporated by reference herein. Those skilled in the art will appreciate that embodiments of the present disclosure can be applied to benefit any known DRG design or other axisymmetric resonator such as rings, cylinders or hemispheres, having asymmetries described by equation (1).

4. Methods of Tuning a Disc Resonator Gyroscope

Figure 5A:
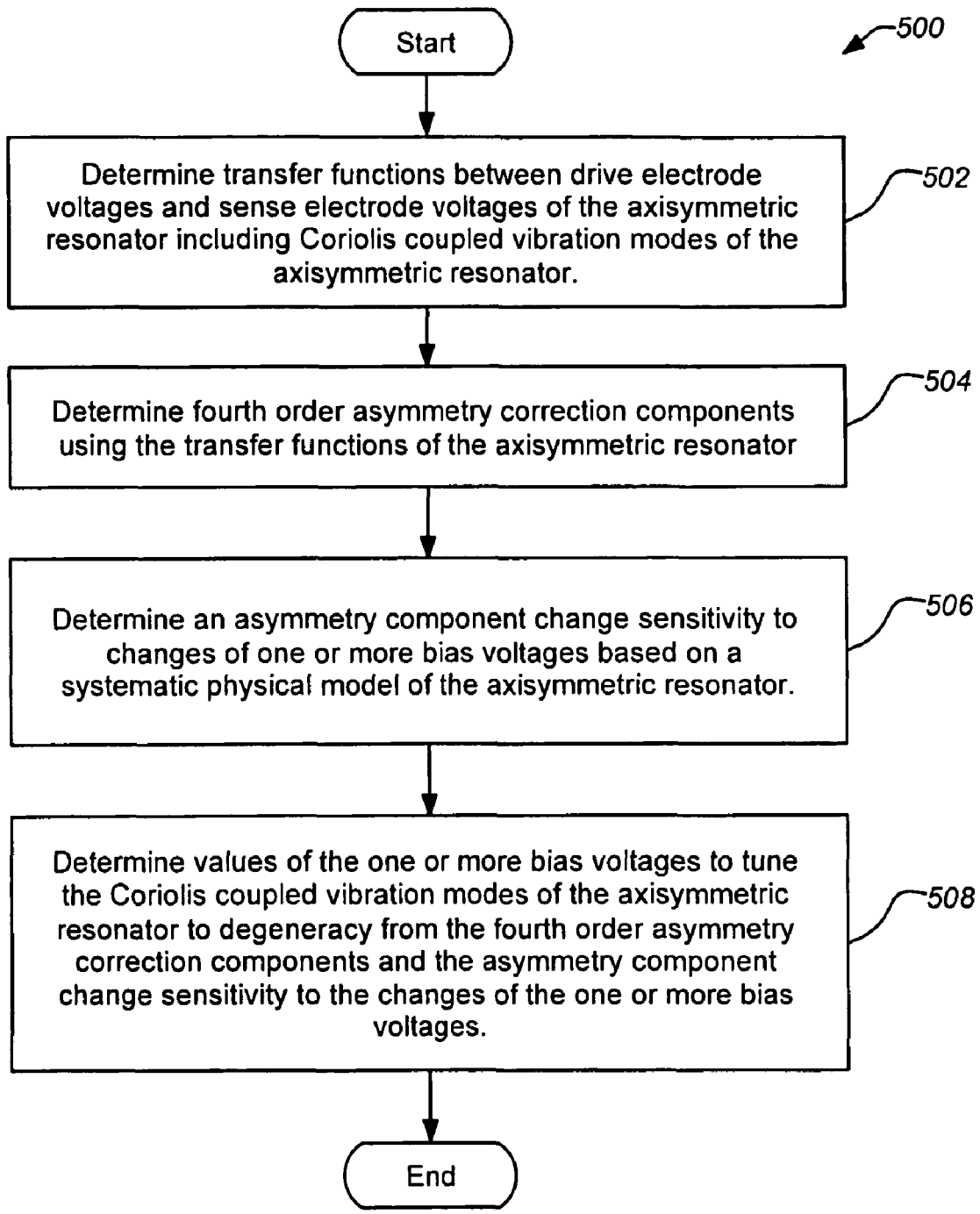
FIG. 5A is a flowchart of an exemplary method for tuning a disc resonator using the bias voltages.

FIG. 5A is a flowchart of an exemplary method 500 for tuning an axisymmetric resonator using the bias voltages. The method 500 begins with an operation 502 of determining transfer functions between drive electrode voltages and sense electrode voltages of the axisymmetric resonator including Coriolis coupled vibration modes of the axisymmetric resonator. In operation 504 fourth order asymmetry correction components are determined using the transfer functions of the axisymmetric resonator. Next in operation 506, an asymmetry component change sensitivity to changes of one or more bias voltages based on a systematic physical model of the axisymmetric resonator is determined. Finally in operation 508, values of the one or more bias voltages are determined to tune the Coriolis coupled vibration modes of the axisymmetric resonator to degeneracy from the fourth order asymmetry correction components and the asymmetry component change sensitivity to the changes of the one or more bias voltages.

Figure 5B:
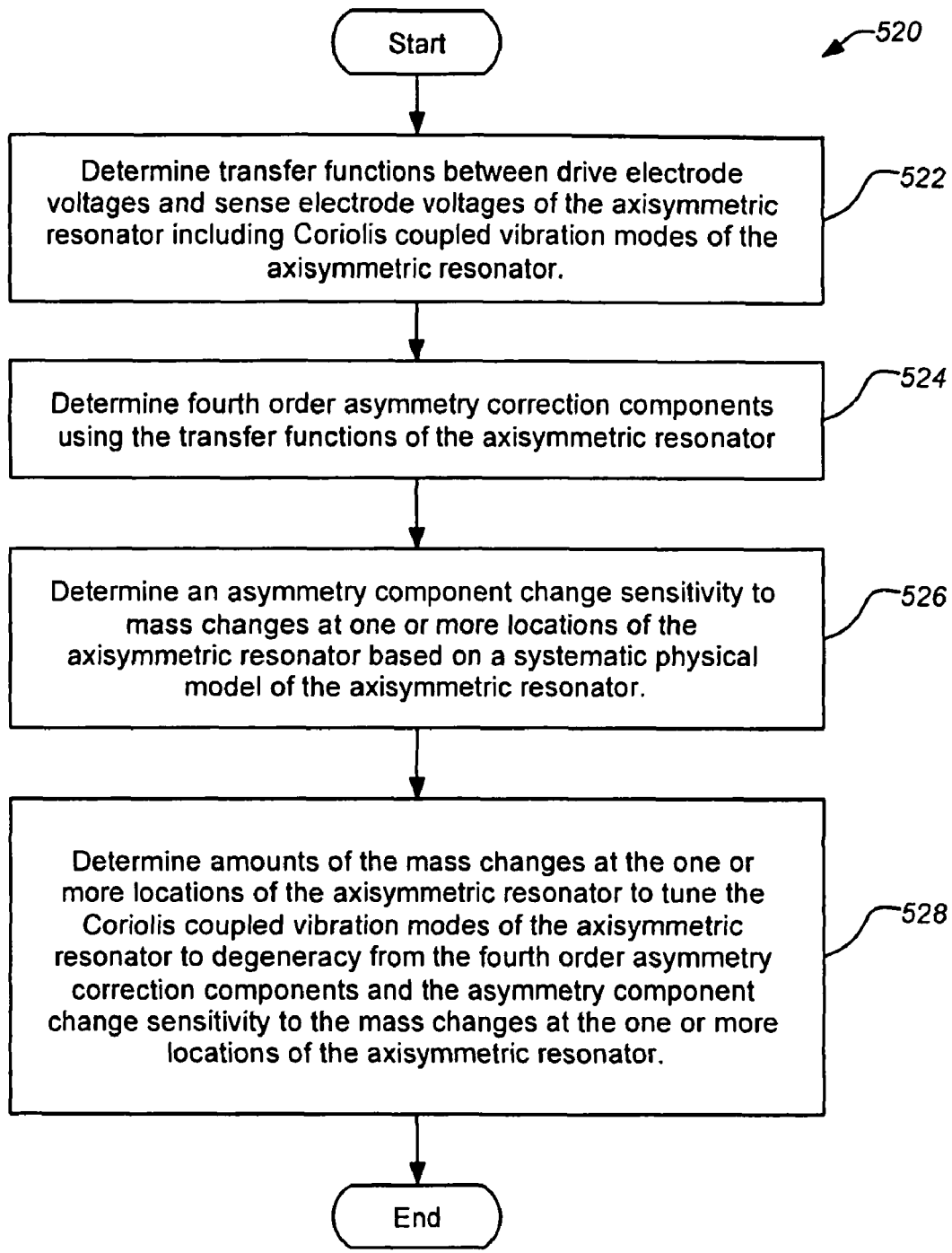
FIG. 5B is a flowchart of an exemplary method for tuning a disc resonator using mass changes to the disc resonator.

FIG. 5B is a flowchart of an exemplary method 520 for tuning an axisymmetric resonator using mass changes to the axisymmetric resonator. Beginning with operation 522, transfer functions between drive electrode voltages and sense electrode voltages of the axisymmetric resonator including Coriolis coupled vibration modes of the axisymmetric resonator are determined. Next in operation 524, fourth order asymmetry correction components are determined using the transfer functions of the axisymmetric resonator. In operation 526 an asymmetry component change sensitivity to mass changes at one or more locations of the axisymmetric resonator based on a systematic physical model of the axisymmetric resonator is determined. Finally in operation 528, required amounts of the mass changes at the one or more locations of the axisymmetric resonator are determined in order to tune the Coriolis coupled vibration modes of the axisymmetric resonator to degeneracy from the fourth order asymmetry correction components and the asymmetry component change sensitivity to the mass changes at the one or more locations of the axisymmetric resonator.

It should be noted that mass changes may involve either removing or adding mass to the axisymmetric resonator. A typical microelectromechanical system (MEMS) axisymmetric resonator, such as a disc resonator in a gyroscope, may be manufactured using any known semiconductor processes. Material removal may be performed by laser trimming. Analysis under the method 520 is identical in either case.

Figure 6A:
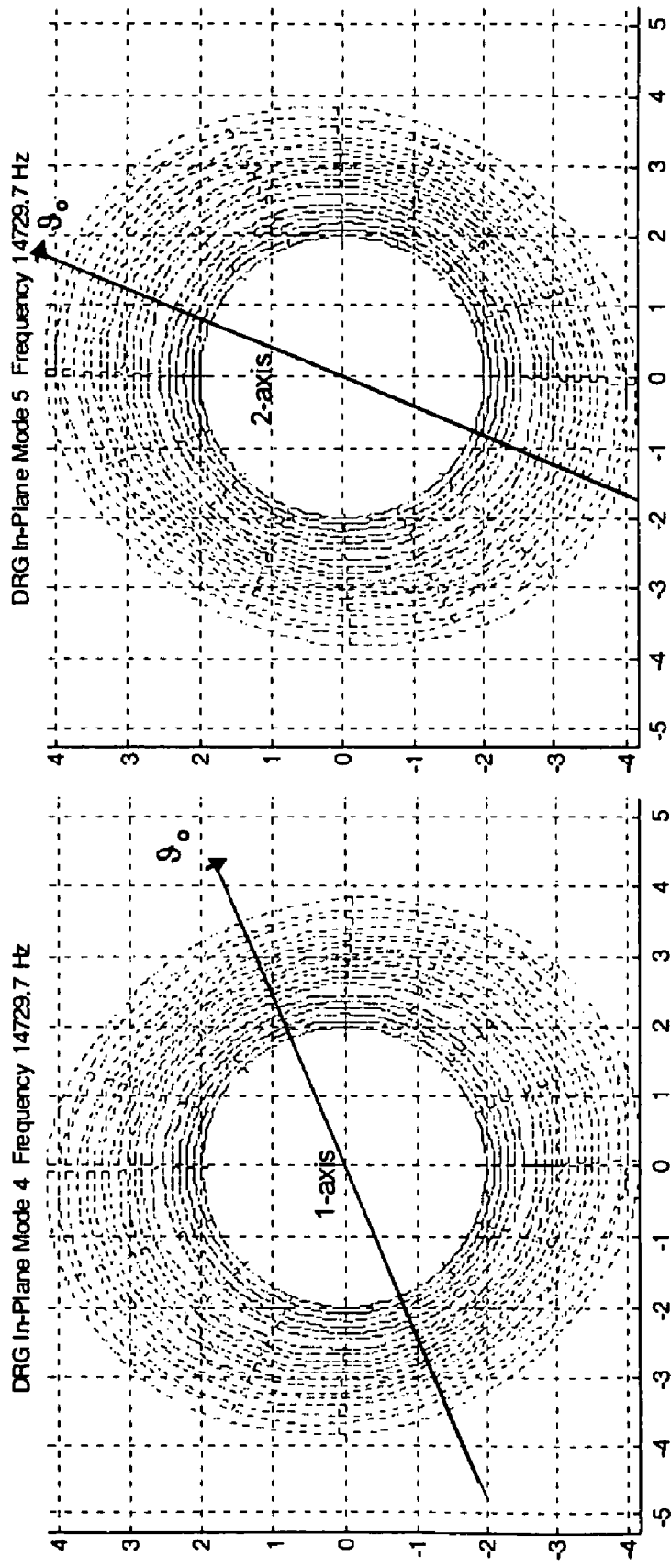
Figure 6B:
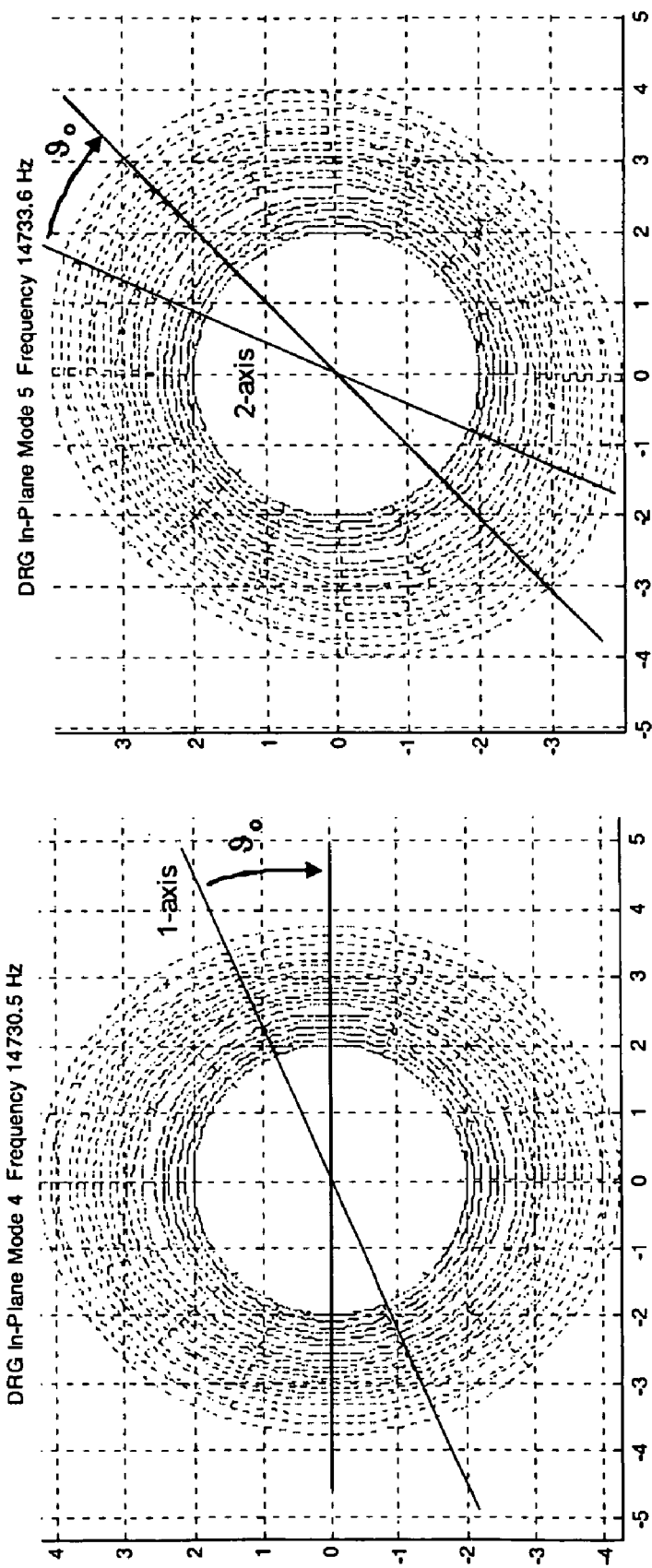

FIGS. 6A to 6C illustrate a tuning simulation of on a systematic physical model of a disc resonator. The systematic physical model applied in the simulation is the FEM described in FIGS. 2A to 2C above.

FIG. 6A illustrates the two Coriolis coupled modes in an initial tuned reference condition. In this case, the model yields Δf=0.00004 Hz, substantially degenerate, and $\theta_0$=−0.001°, having a negligible frequency shift. The electrode voltages are set at GB=15V and BT1, BT2, BX1, and BX2 are all 0. The identified mass locations are changed by MT1=0.043 nanograms, and MT2, MX1, and MX2 are all 0. Note that the MT1 is only set with a negligible perturbance to stabilize the model.

Next, FIG. 6B illustrates the two Coriolis coupled modes in a simulated detuned condition. Now, the mass locations are changed by MT1=0.043 nanograms, MT2=0, MX1=−868.3 nanograms, MX2=0. The simulated alteration of MX1 by −868.3 nanograms (which may have been caused by laser ablation of the resonator) induces a frequency split of Δf=3.1240 Hz, and a frequency shift of $\theta_0$=−22.51°. The electrode voltages are left at BT1=BT2=BX1=BX2=0, and GB=15V. Note that, although the simulation of FIG. 6B "detunes" the resonator through a mass perturbation, it demonstrates that the systematic model captures frequency sensitivity to mass changes at the identified location. Thus, the systematic model may be similarly applied for tuning a resonator by mass changes at the defined locations.

Finally, FIG. 6C illustrates the two Coriolis coupled modes in a simulated electrostatically retuned condition. Now the solution derived from the transfer functions of the systematic model and the single step method indicates that the electrode voltages must be set at BT1=−0.0007, BT2=0, BX1=−7.040 V, BX2=0, and GB=15V in order to yield a tuned condition having a nominal zero frequency split. The actual tuning achieved, Δf=0.0025 Hz. for the 14,700 Hz modes is due to numerical inaccuracy of the model and is practically degenerate for silicon resonators with Q>50,000 and resonance width of 14700/Q=0.3 Hz The mass change settings unchanged over those of FIG. 6B.

Those skilled in the art will appreciate that the asymmetry component change sensitivity (to changes in either bias voltages or mass changes at the identified locations) is derived numerically from the systematic model, the FEM model of the disc resonator as previously described. This enables an elegant tuning solution to benefit known DRG design or any other axisymmetric resonators such as rings, cylinders or hemispheres, having asymmetries defined by equation (1).

Figure 7:
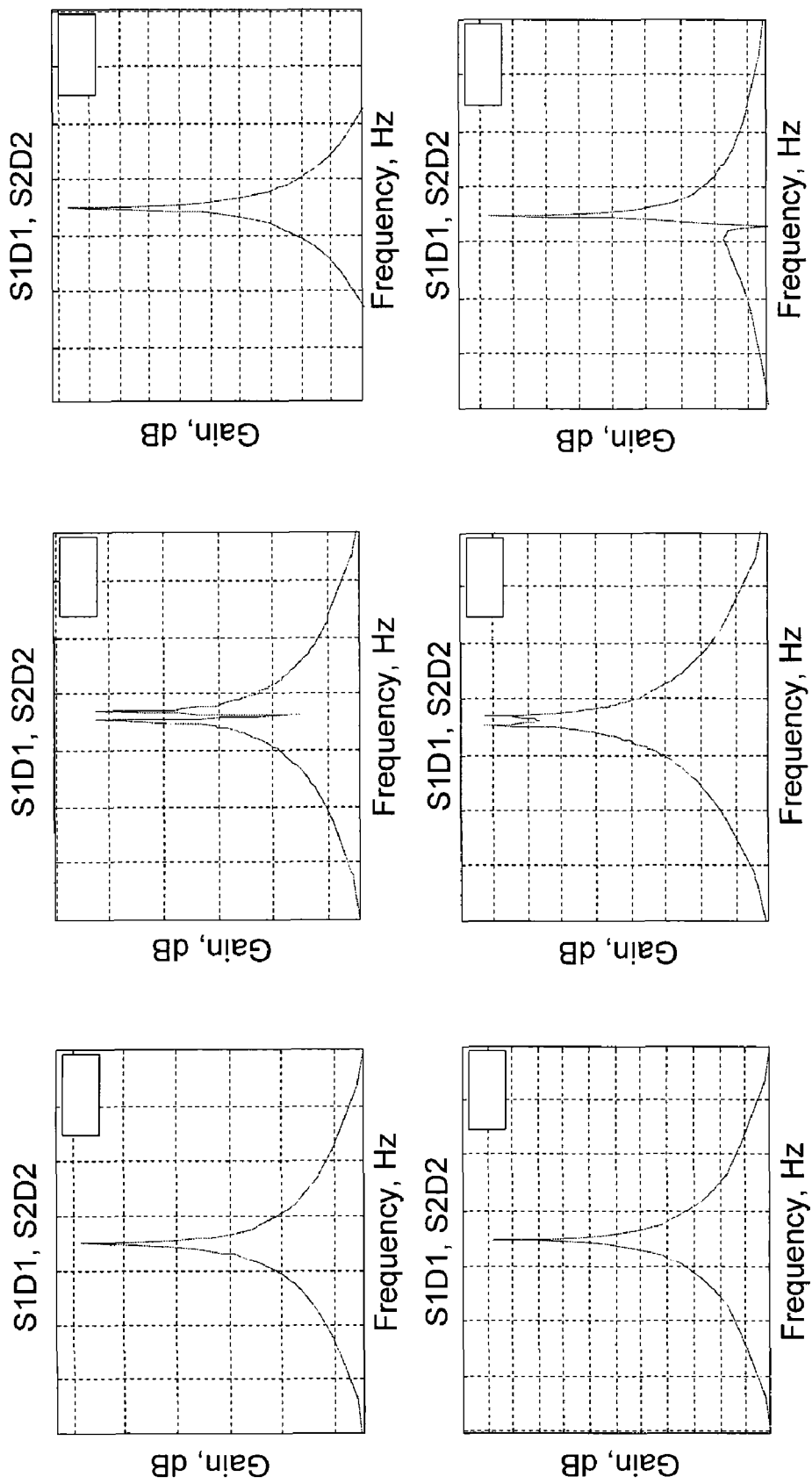
FIG. 7 shows transfer functions of the electrodes of the systematic physical model of the disc resonator tuning simulation of FIGS. 6A to 6C.

FIG. 7 shows transfer functions of the electrodes of the systematic physical model of the disc resonator tuning simulation of FIGS. 6A to 6C. In this case, for each of the conditions of FIGS. 6A to 6C the frequency splits measured from pairs of sense and drive electrodes of the resonator are plotted. The upper and lower left plots correspond to S1D1, S2D2 and S1D2, S2D1 plots, respectively, of the referenced tuned condition of FIG. 6A. The modes are degenerate as no frequency split is shown. The upper and lower center plots correspond to S1D1, S2D2 and S1D2, S2D1 plots, respectively, of the referenced detuned condition of FIG. 6B (i.e. by simulated mass perturbation). A clear split in the modal frequencies is show, particularly by the upper plot. Finally, the upper and lower right plots correspond to S1D1, S2D2 and S1D2, S2D1 plots, respectively, of the referenced retuned condition of FIG. 6C (i.e. by simulated electrostatic biasing). Here the modes are again degenerate with no frequency split shown.

This concludes the description including the preferred embodiments of the present invention. The foregoing description including the preferred embodiments of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method of tuning an axisymmetric resonator, comprising:
    determining transfer functions between drive electrode voltages and sense electrode voltages of the axisymmetric resonator including Coriolis coupled vibration modes of the axisymmetric resonator;
    determining fourth order asymmetry correction components using the transfer functions of the axisymmetric resonator;
    determining an asymmetry component change sensitivity to changes of one or more bias voltages based on a systematic physical model of the axisymmetric resonator; and
    determining values of the one or more bias voltages to tune the Coriolis coupled vibration modes of the axisymmetric resonator to degeneracy from the fourth order asymmetry correction components and the asymmetry component change sensitivity to the changes of the one or more bias voltages.

2. The method of claim 1, further comprising applying settings of the one or more bias voltages under a closed loop control to tune the Coriolis coupled vibration modes of the axisymmetric resonator to degeneracy.

3. The method of claim 2, wherein applying the settings of the one or more bias voltages under the closed loop control is performed in a single step.

4. The method of claim 1, wherein the transfer functions are derived numerically from a finite element model (FEM) of the axisymmetric resonator.

5. The method of claim 4, wherein the fourth order asymmetry correction components are derived from the FEM of the axisymmetric resonator.

6. The method of claim 1, wherein the transfer functions are measured from the axisymmetric resonator.

7. The method of claim 6, wherein the fourth order asymmetry correction components are determined from the measured transfer functions.

8. The method of claim 6, wherein the transfer functions are measured from the axisymmetric resonator with a dynamic signal analyzer.

9. The method of claim 1, wherein the axisymmetric resonator comprises a disc resonator including embedded electrostatic electrodes having sidewalls that interact with interior sidewalls of the disc resonator such that the Coriolis coupled vibration modes of the disc resonator are driven and sensed with the embedded electrostatic electrodes to measure motion of the disc resonator.

10. A method of tuning an axisymmetric resonator, comprising:
    determining transfer functions between drive electrode voltages and sense electrode voltages of the axisymmetric resonator including Coriolis coupled vibration modes of the axisymmetric resonator;
    determining fourth order asymmetry correction components using the transfer functions of the axisymmetric resonator;
    determining an asymmetry component change sensitivity to mass changes at one or more locations of the axisymmetric resonator based on a systematic physical model of the axisymmetric resonator; and
    determining amounts of the mass changes at the one or more locations of the axisymmetric resonator to tune the Coriolis coupled vibration modes of the axisymmetric resonator to degeneracy from the fourth order asymmetry correction components and the asymmetry component change sensitivity to the mass changes at the one or more locations of the axisymmetric resonator.

11. The method of claim 10, further comprising applying the mass changes at the one or more locations of the axisymmetric resonator to tune the Coriolis coupled vibration modes of the axisymmetric resonator to degeneracy.

12. The method of claim 11, wherein applying the mass changes at the one or more locations of the axisymmetric resonator is performed in a single step.

13. The method of claim 10, wherein the transfer functions are derived numerically from a finite element model (FEM) of the axisymmetric resonator.

14. The method of claim 13, wherein the fourth order asymmetry correction components are derived from the FEM of the axisymmetric resonator.

15. The method of claim 10, wherein the transfer functions are measured from the axisymmetric resonator.

16. The method of claim 15, wherein the fourth order asymmetry correction components are determined from the measured transfer functions.

17. The method of claim 15, wherein the transfer functions are measured from the axisymmetric resonator with a dynamic signal analyzer.

18. The method of claim 10, wherein the axisymmetric resonator comprises a disc resonator including embedded electrostatic electrodes having sidewalls that interact with interior sidewalls of the disc resonator such that the Coriolis coupled vibration modes of the disc resonator are driven and sensed with the embedded electrostatic electrodes to measure motion of the disc resonator.

19. A method of tuning an axisymmetric resonator, comprising:

measuring transfer functions between drive electrode voltages and sense electrode voltages of the axisymmetric resonator with a dynamic signal analyzer including Coriolis coupled vibration modes of the axisymmetric resonator;

determining fourth order asymmetry correction components from the measured transfer functions of the axisymmetric resonator;

determining an asymmetry component change sensitivity to changes of one or more tuning parameters of the axisymmetric resonator based on a systematic physical model of the axisymmetric resonator; and determining settings of the one or more tuning parameters to tune the Coriolis coupled vibration modes of the axisymmetric resonator to degeneracy from the fourth order asymmetry correction components and the asymmetry component change sensitivity to the changes of the one or more tuning parameters.

20. The method of claim 19, wherein the one or more tuning parameters comprise changes of one or more bias voltages of the axisymmetric resonator and the settings comprise values of the one or more bias voltages.

21. The method of claim 19, wherein the one or more tuning parameters comprise mass changes at one or more locations of the axisymmetric resonator and the settings comprise amounts of the mass changes at the one or more locations of the axisymmetric resonator.

22. The method of claim 19, wherein the axisymmetric resonator comprises a disc resonator including embedded electrostatic electrodes having sidewalls that interact with interior sidewalls of the disc resonator such that the Coriolis coupled vibration modes of the disc resonator are driven and sensed with the embedded electrostatic electrodes to measure motion of the disc resonator.

* * * * *